United States Patent
Davis, Jr. et al.

(10) Patent No.: US 9,752,503 B2
(45) Date of Patent: *Sep. 5, 2017

(54) POWER GENERATION SYSTEM EXHAUST COOLING

(71) Applicant: General Electric Company, Schenectady, NY (US)

(72) Inventors: Lewis Berkley Davis, Jr., Niskayuna, NY (US); Parag Prakash Kulkarni, Niskayuna, NY (US); Robert Joseph Reed, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/753,072

(22) Filed: Jun. 29, 2015

(65) Prior Publication Data

US 2016/0376992 A1    Dec. 29, 2016

(51) Int. Cl.
*F02C 9/18*     (2006.01)
*F02C 7/141*    (2006.01)
(Continued)

(52) U.S. Cl.
CPC .......... *F02C 7/141* (2013.01); *B01D 53/9431* (2013.01); *F01D 25/305* (2013.01);
(Continued)

(58) Field of Classification Search
CPC .............. F01N 3/2066; F01N 2270/02; F01N 2610/02; F02C 6/08; F02C 9/18; F02C 3/30; F05D 2270/082
See application file for complete search history.

(56) References Cited

U.S. PATENT DOCUMENTS 3,998,047 A    12/1976 Walker
4,131,432 A    12/1978 Sato et al.
(Continued)

FOREIGN PATENT DOCUMENTS

CN          679236 A5    1/1992
EP       1 643 113 A2    4/2006
(Continued)

OTHER PUBLICATIONS

Licata A., et al., "Viability of SCR on Simple Cycle Frame Gas Turbines," Licata Energy & Environmental Donsultants, Inc., Yonkers, NY, Power Gen. 2014, Dec. 9-11, 2014, pp. 1-13.
"Turbofan," From Wikipedia, the free encyclopedia, Retrieved from the Internet URL: http://en.wikipedia.org/wiki/Turbofan, on Jan. 3, 2017, pp. 1-21.
(Continued)

*Primary Examiner* — Pascal M Bui Pho
*Assistant Examiner* — Rene Ford
(74) *Attorney, Agent, or Firm* — Ernest G. Cusick; Hoffman Warnick LLC (57) ABSTRACT

An airflow control system for a gas turbine system according to an embodiment includes: a compressor component of a gas turbine system for generating an excess flow of air; a mixing area for receiving an exhaust gas stream produced by the gas turbine system; an air extraction system for extracting at least a portion of the excess flow of air generated by the compressor component of the gas turbine system to provide bypass air; and diverting the bypass air into the mixing area to reduce a temperature of the exhaust gas stream; and an exhaust processing system for processing the reduced temperature exhaust gas stream.

12 Claims, 3 Drawing Sheets

(51) Int. Cl.
*F02C 6/08* (2006.01)
*F01D 25/30* (2006.01)
*B01D 53/94* (2006.01)
*F02C 3/04* (2006.01)
*F01N 3/20* (2006.01)

(52) U.S. Cl.
CPC ............... *F02C 3/04* (2013.01); *F02C 9/18* (2013.01); *F01N 3/2066* (2013.01); *F01N 2610/02* (2013.01); *F05D 2220/32* (2013.01); *F05D 2250/80* (2013.01); *F05D 2260/201* (2013.01); *F05D 2260/232* (2013.01); *F05D 2260/606* (2013.01); *F05D 2270/082* (2013.01); *F05D 2270/303* (2013.01); *F05D 2270/3061* (2013.01); *F05D 2270/3062* (2013.01)

(56) References Cited

U.S. PATENT DOCUMENTS

| | | |
|---|---|---|
| 4,165,609 A | 8/1979 | Rudolph |
| 4,292,008 A | 9/1981 | Grosjean et al. |
| 4,875,436 A | 10/1989 | Smith et al. |
| 4,961,312 A | 10/1990 | Simmons |
| 4,982,564 A | 1/1991 | Hines |
| 5,255,505 A | 10/1993 | Cloyd et al. |
| 5,473,898 A | 12/1995 | Briesch |
| 6,161,768 A | 12/2000 | Gordon et al. |
| 6,250,061 B1 | 6/2001 | Orlando |
| 6,612,114 B1 | 9/2003 | Klingels |
| 7,493,769 B2 | 2/2009 | Jangili |
| 7,622,094 B2 | 11/2009 | Lewis et al. |
| 7,966,825 B2 | 6/2011 | Judd |
| 8,186,152 B2 | 5/2012 | Zhang et al. |
| 2002/0124568 A1 | 9/2002 | Mikkelsen et al. |
| 2003/0182944 A1 | 10/2003 | Hoffman et al. |
| 2005/0150229 A1 | 7/2005 | Baer et al. |
| 2007/0130952 A1 | 6/2007 | Copen |
| 2008/0116054 A1 | 5/2008 | Leach et al. |
| 2010/0024379 A1 | 2/2010 | Sengar et al. |
| 2010/0064655 A1 | 3/2010 | Zhang et al. |
| 2010/0215558 A1 | 8/2010 | Kraemer |
| 2011/0030331 A1 | 2/2011 | Tong et al. |
| 2011/0036066 A1 | 2/2011 | Zhang et al. |
| 2011/0067385 A1 | 3/2011 | Hirata et al. |
| 2011/0138771 A1 | 6/2011 | Feller et al. |
| 2011/0158876 A1 | 6/2011 | Buzanowski et al. |
| 2012/0171020 A1 | 7/2012 | Peck et al. |
| 2013/0318941 A1 | 12/2013 | Ekanayake et al. |
| 2013/0318984 A1 | 12/2013 | Ekanayake et al. |
| 2013/0318997 A1 | 12/2013 | Conchieri et al. |
| 2014/0150447 A1 | 6/2014 | Ekanayake et al. |
| 2014/0230444 A1 | 8/2014 | Hao et al. |
| 2014/0234073 A1 | 8/2014 | Moreton et al. |
| 2015/0047359 A1 | 2/2015 | Maguire et al. |
| 2016/0348560 A1 | 12/2016 | Sato et al. |
| 2016/0376959 A1 | 12/2016 | Davis, Jr. et al. |

FOREIGN PATENT DOCUMENTS

| | | |
|---|---|---|
| EP | 2 223 733 A1 | 9/2010 |
| EP | 2 615 265 A2 | 7/2013 |
| EP | 3 070 301 A1 | 9/2016 |
| GB | 774425 A | 5/1957 |
| JP | 2013124555 | 6/2013 |
| WO | 2012/092215 A1 | 7/2012 |

OTHER PUBLICATIONS

Extended European Search Report and Opinion issued in connection with related EP Application No. 16176400.6 dated Nov. 14, 2016.
Extended European Search Report and Opinion issued in connection with related EP Application No. 16176128.3 dated Nov. 15, 2016.
Extended European Search Report and Opinion issued in connection with related EP Application No. 16175821.4 dated Nov. 16, 2016.
Extended European Search Report and Opinion issued in connection with related EP Application No. 16175335.5 dated Nov. 25, 2016.
Extended European Search Report and Opinion issued in connection with related EP Application No. 16176515.1 dated Nov. 28, 2016.
Extended European Search Report and Opinion issued in connection with related EP Application No. 16176652.2 dated Nov. 28, 2016.
Extended European Search Report and Opinion issued in connection with related EP Application No. 16175556.6 dated Nov. 28, 2016.
Extended European Search Report and Opinion issued in connection with corresponding EP Application No. 16176514.4 dated Dec. 2, 2016.
Non-Final Rejection towards related U.S. Appl. No. 14/753,073 dated Dec. 13, 2016.
Reed et al., filed Jun. 29, 2015, U.S. Appl. No. 14/753,088.
Davis et al., filed Jun. 29, 2015, U.S. Appl. No. 14/753,064.
Davis et al., filed Jun. 29, 2015, U.S. Appl. No. 14/753,066.
Kulkarni et al., filed Jun. 29, 2015, U.S. Appl. No. 14/753,073.
Kulkarni et al., filed Jun. 29, 2015, U.S. Appl. No. 14/753,074.
Reed et al., filed Jun. 29, 2015, U.S. Appl. No. 14/753,077.
Kulkarni et al., filed Jun. 29, 2015, U.S. Appl. No. 14/753,080.
Kulkarni et al., filed Jun. 29, 2015, U.S. Appl. No. 14/753,085.
Kulkarni et al., filed Jun. 29, 2015, U.S. Appl. No. 14/753,093.
Davis et al., filed Jun. 29, 2015, U.S. Appl. No. 14/753,102.
Kulkarni et al., filed Jun. 29, 2015, U.S. Appl. No. 14/753,107.
Davis et al., filed Jun. 29, 2015, U.S. Appl. No. 14/753,097.
Reed et al., filed Jun. 29, 2015, U.S. Appl. No. 14/753,105.
Michael J. Reale, "New High Efficiency Simple Cycle Gas Turbine," General Electric Company, 2004, 20 pages. http://site.ge-energy.com/prod_serv/products/tech_docs/en/downloads/ger4222a.pdf.
Chupka, Marc; "Independent Evaluation of SCR Systems for Frame-Type Combustion Turbines"; The Brattle Group; Anthony Licata, Licata Energy & Environmental Consulting, Inc.; Report for ICAP Demand Curve Reset; Prepared for New York Independent System Operator, Inc.; Nov. 1, 2013; 42 pages.
U.S. Appl. No. 14/753,073, Office Action 1 dated Dec. 13, 2016, 16 pages.
U.S. Appl. No. 14/753,064, Office Action 1 dated Jan. 19, 2017, 24 pages.
U.S. Appl. No. 141753,066, Office Action 1 dated Feb. 24, 2017, 33 pages.
U.S. Appl. No. 14/753,074, Office Action 1 dated Mar. 10, 2017, 41 pages.
U.S. Appl. No. 14/753,093, Office Action 1 dated Jun. 1, 2017, 40 pages.
U.S. Appl. No. 14/753,064, Final Office Action dated Jun. 2, 2017, 31 pages.
U.S. Appl. No. 141753,073, Final Office Action 1 dated Jun. 20, 2017, 28 pages.
U.S. Appl. No. 14/753,088, Office Action 1 dated Jun. 28, 2017, 37 pages.
U.S. Appl. No. 14/753,066, Notice of Allowance dated Jul. 13, 2017, 27 pages.

POWER GENERATION SYSTEM EXHAUST COOLING

CROSS-REFERENCE TO RELATED APPLICATIONS

This application is related to co-pending US application numbers: application Ser. No. 14/753,064, application Ser. No. 14/753,066, application Ser. No. 14/753,073, application Ser. No. 14/753,074, application Ser. No. 14/753,077, application Ser. No. 14/753,080, application Ser. No. 14/753,085, application Ser. No. 14/753,088, application Ser. No. 14/753,093, application Ser. No. 14/753,102, application Ser. No. 14/753,107, application Ser. No. 14/753,097, and application Ser. No. 14/753,105, all filed on Jun. 29, 2015.

BACKGROUND OF THE INVENTION

The disclosure relates generally to power generation systems, and more particularly, to systems and methods for cooling the exhaust gas of power generation systems.

Exhaust gas from power generation systems, for example a simple cycle gas turbine power generation system, often must meet stringent regulatory requirements for the composition of the exhaust gas released into the atmosphere. One of the components typically found in the exhaust gas of a gas turbine power generation system and subject to regulation is nitrogen oxide (i.e., $NO_x$), which includes, for example, nitric oxide and nitrogen dioxide. To remove $NO_x$ from the exhaust gas stream, technology such as selective catalytic reduction (SCR) is often utilized. In an SCR process, ammonia ($NH_3$) or the like reacts with the $NO_x$ and produces nitrogen ($N_2$) and water ($H_2O$).

The effectiveness of the SCR process depends in part on the temperature of the exhaust gas that is processed. The temperature of the exhaust gas from a gas turbine power generation system is often higher than about 1100° F. However, SCR catalysts need to operate at less than about 900° F. to maintain effectiveness over a reasonable catalyst lifespan. To this extent, the exhaust gas from a simple cycle gas turbine power generation system is typically cooled prior to SCR.

Large external blower systems have been used to reduce the exhaust gas temperature of a gas turbine power generation system below 900° F. by mixing a cooling gas, such as ambient air, with the exhaust gas. Because of the possibility of catalyst damage due to a failure of an external blower system, a redundant external blower system is typically utilized. These external blower systems include many components, such as blowers, motors, filters, air intake structures, and large ducts, which are expensive, bulky, and add to the operating cost of a gas turbine power generation system. Additionally, the external blower systems and the operation of the gas turbine power generation system are not inherently coupled, thus increasing the probability of SCR catalyst damage due to excess temperature during various modes of gas turbine operation. To prevent SCR catalyst damage due to excess temperature (e.g., if the external blower system(s) fail or cannot sufficiently cool the exhaust gas), the gas turbine may need to be shut down until the temperature issue can be rectified.

BRIEF DESCRIPTION OF THE INVENTION

A first aspect of the disclosure provides an airflow control system for a gas turbine system, including: a compressor component of a gas turbine system for generating an excess flow of air; a mixing area for receiving an exhaust gas stream produced by the gas turbine system; and an air extraction system for extracting at least a portion of the excess flow of air generated by the compressor component to provide bypass air, and for diverting the bypass air into the mixing area to reduce a temperature of the exhaust gas stream.

A second aspect of the disclosure provides a turbomachine system including: a compressor component, a combustor component, and a turbine component, wherein the compressor component of the gas turbine system includes at least one oversized compressor stage for generating an excess flow of air; a mixing area for receiving an exhaust gas stream produced by the gas turbine system; an air extraction system for extracting at least a portion of the excess flow of air generated by the at least one oversized compressor stage of the compressor component to provide bypass air; and diverting the bypass air into the mixing area to reduce a temperature of the exhaust gas stream; and an exhaust processing system for processing the reduced temperature exhaust gas stream, wherein the exhaust processing system comprises a selective catalytic reduction (SCR) system.

A third aspect of the disclosure provides power generation system, including: a gas turbine system including a compressor component, a combustor component, and a turbine component, wherein the compressor component of the gas turbine system includes at least one oversized compressor stage for generating an excess flow of air; a shaft driven by the turbine component; an electrical generator coupled to the shaft for generating electricity; a mixing area for receiving the exhaust gas stream produced by the gas turbine system; an air extraction system for extracting at least a portion of the excess flow of air generated by the at least one oversized compressor stage of the compressor component to provide bypass air; and diverting the bypass air into the mixing area to reduce a temperature of the exhaust gas stream, wherein the excess flow of air generated by the oversized compressor stage of the compressor component is about 10% to about 40% greater than a flow rate capacity of at least one of the combustor component and the turbine component of the gas turbine system; and an exhaust processing system for processing the reduced temperature exhaust gas stream, wherein the exhaust processing system comprises a selective catalytic reduction (SCR) system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to power generation systems, and more particularly, to systems and methods for cooling the exhaust gas of power generation systems.

Figure 1:
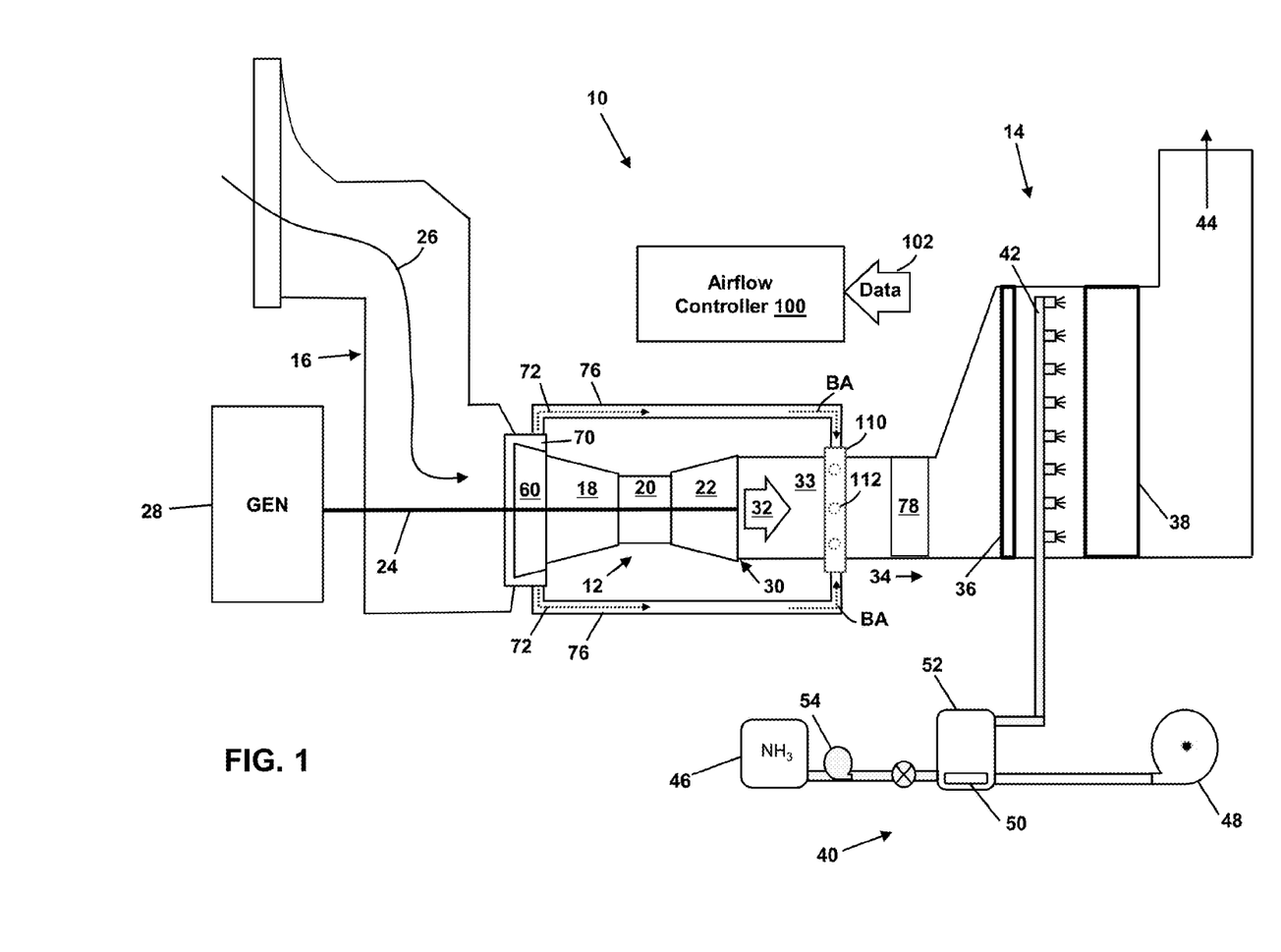
FIG. 1 shows a schematic diagram of a simple cycle gas turbine power generation system according to embodiments.

FIG. 1 is a block diagram of a turbomachine (e.g., a simple cycle gas turbine power generation system 10) that includes a gas turbine system 12 and an exhaust processing system 14. The gas turbine system 12 may combust liquid or gas fuel, such as natural gas and/or a hydrogen-rich synthetic gas, to generate hot combustion gases to drive the gas turbine system 12.

The gas turbine system 12 includes an air intake section 16, a compressor component 18, a combustor component 20, and a turbine component 22. The turbine component 22 is drivingly coupled to the compressor component 18 via a shaft 24. In operation, air (e.g., ambient air) enters the gas turbine system 12 through the air intake section 16 (indicated by arrow 26) and is pressurized in the compressor component 18. The compressor component 18 includes at least one stage including a plurality of compressor blades coupled to the shaft 24. Rotation of the shaft 24 causes a corresponding rotation of the compressor blades, thereby drawing air into the compressor component 18 via the air intake section 16 and compressing the air prior to entry into the combustor component 20.

The combustor component 20 may include one or more combustors. In embodiments, a plurality of combustors are disposed in the combustor component 20 at multiple circumferential positions in a generally circular or annular configuration about the shaft 24. As compressed air exits the compressor component 18 and enters the combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through the turbine component 22 flow against and between the turbine blades, thereby driving the turbine blades and, thus, the shaft 24 into rotation. In the turbine component 22, the energy of the combustion gases is converted into work, some of which is used to drive the compressor component 18 through the rotating shaft 24, with the remainder available for useful work to drive a load such as, but not limited to, an electrical generator 28 for producing electricity, and/or another turbine.

The combustion gases that flow through the turbine component 22 exit the downstream end 30 of the turbine component 22 as a stream of exhaust gas 32. The exhaust gas stream 32 may continue to flow in a downstream direction 34 towards the exhaust processing system 14. The downstream end 30 of the turbine component 22 may be fluidly coupled via a mixing area 33 to a CO removal system (including, e.g., a CO catalyst 36) and an SCR system (including, e.g., an SCR catalyst 38) of the exhaust processing system 14. As discussed above, as a result of the combustion process, the exhaust gas stream 32 may include certain byproducts, such as nitrogen oxides ($NO_x$), sulfur oxides ($SO_x$), carbon oxides ($CO_x$), and unburned hydrocarbons. Due to certain regulatory requirements, an exhaust processing system 14 may be employed to reduce or substantially minimize the concentration of such byproducts prior to atmospheric release.

One technique for removing or reducing the amount of $NO_x$ in the exhaust gas stream 32 is by using a selective catalytic reduction (SCR) process. For example, in an SCR process for removing $NO_x$ from the exhaust gas stream 32, ammonia ($NH_3$) or other suitable reductant may be injected into the exhaust gas stream 32. The ammonia reacts with the $NO_x$ to produce nitrogen ($N_2$) and water ($H_2O$).

As shown in FIG. 1, an ammonia evaporator system 40 and an ammonia injection grid 42 may be used to vaporize and inject an ammonia solution (e.g., stored in a tank 46) into the exhaust gas stream 32 upstream of the SCR catalyst 38. The ammonia injection grid 42 may include, for example, a network of pipes with openings/nozzles for injecting vaporized ammonia into the exhaust gas stream 32. As will be appreciated, the ammonia and $NO_x$ in the exhaust gas stream 32 react as they pass through the SCR catalyst 38 to produce nitrogen ($N_2$) and water ($H_2O$), thus removing $NO_x$ from the exhaust gas stream 32. The resulting emissions may be released into the atmosphere through a stack 44 of the gas turbine system 12.

The ammonia evaporator system 40 may further include, for example, a blower system 48, one or more heaters 50 (e.g., electric heaters), and an ammonia vaporizer 52, for providing vaporized ammonia that is injected into the exhaust gas stream 32 via the ammonia injection grid 42. The ammonia may be pumped from the tank 46 to the ammonia vaporizer 52 using a pump system 54. The blower system 48 may include redundant blowers, while the pump system 54 may include redundant pumps to ensure continued operation of the ammonia evaporator system 40 in case of individual blower/pump failure.

The effectiveness of the SCR process depends in part on the temperature of the exhaust gas stream 32 that is processed. The temperature of the exhaust gas stream 32 generated by the gas turbine system 12 is often higher than about 1100° F. However, the SCR catalyst 38 typically needs to operate at temperatures less than about 900° F.

According to embodiments, an "oversized" compressor component 18 may be used to provide cooling air for lowering the temperature of the exhaust gas stream 32 to a level suitable for the SCR catalyst 38. The compressor component 18 has a flow rate capacity and is configured to draw in a flow of air (ambient air) via the air intake section 16 based on its flow rate capacity. The flow rate capacity of the compressor component 18 may be about 10% to about 40% greater than the flow rate capacity of at least one of the combustor component 20 and the turbine component 22, creating an excess flow of air. That is, at least one of the combustor component 20 and the turbine component 22 cannot take advantage of all of the air provided by the compressor component 18, and an excess flow of air is created by the compressor component 18. This excess flow of air may be used to cool the exhaust gas stream 32 of the gas turbine system 12. According to embodiments, at least one of the compressor stages 60 of the compressor component 18 may be "oversized" in order to provide the excess flow of air.

Use of a single oversized compressor stage 60 is described below; however, this is not intended to be limiting and additional oversized compressor stages 60 may be used in other embodiments. In general, the percentage increase in the flow of air drawn in by the at least one oversized compressor stage 60 of the oversized compressor component 18 may be varied and selectively controlled based on several factors including the load on the gas turbine system 12, the temperature of the air being drawn into the gas turbine system 12, the temperature of the exhaust gas stream 32 at the SCR catalyst 38, etc.

Figure 2:
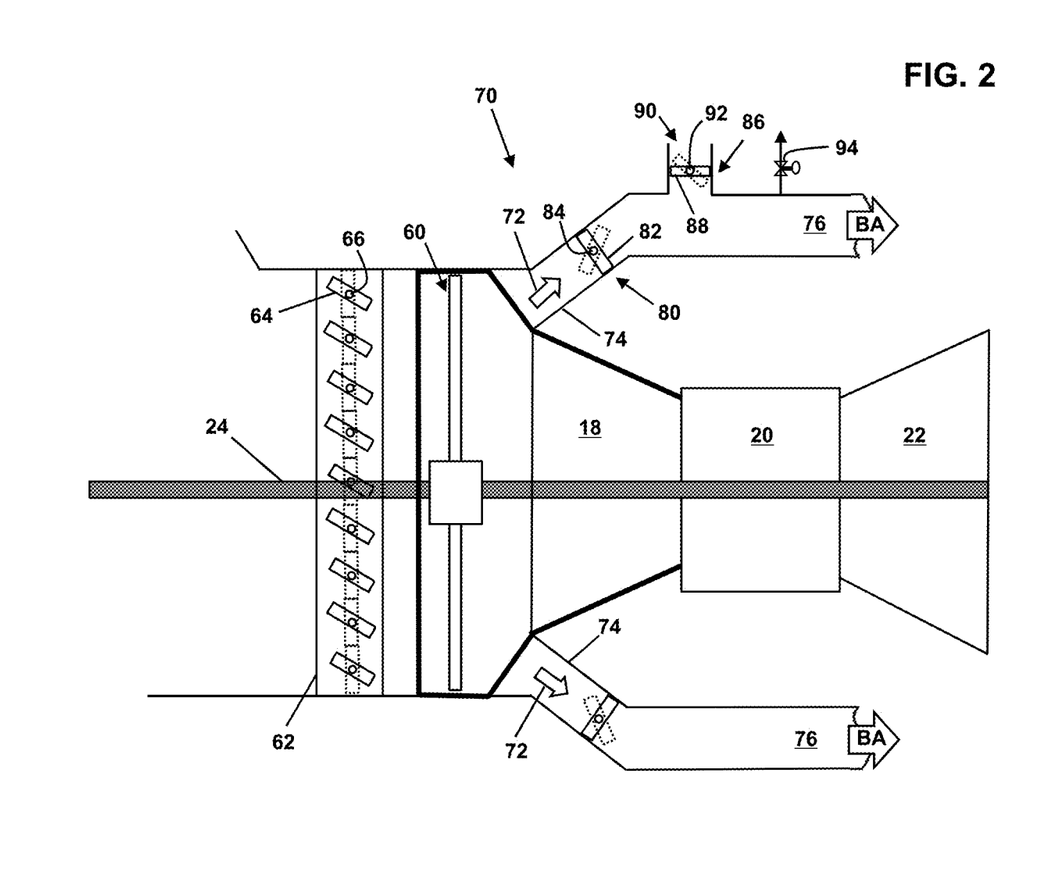
FIG. 2 depicts an enlarged view of a portion of the gas turbine power generation system of FIG. 1 according to embodiments.

As depicted in FIG. 2, an inlet guide vane assembly 62 including a plurality of inlet guide vanes 64 may be used to control the amount of air directed toward the compressor component 18. Each inlet guide vane 64 may be selectively controlled (e.g., rotated) by an independent actuator 66. Actuators 66 according to various embodiments are shown schematically in FIG. 2, but any known actuator may be utilized. For example, the actuators 66 may comprise an electro-mechanical motor, or any other type of suitable actuator.

The actuators 66 may be independently and/or collectively controlled in response to commands from an airflow controller 100 to selectively vary the positioning of the inlet guide vanes 64. That is, the inlet guide vanes 64 may be selectively rotated about a pivot axis by the actuators 66. In embodiments, each inlet guide vane 64 may be individually pivoted independently of any other inlet guide vane 64. In other embodiments, groups of inlet guide vanes 64 may be pivoted independently of other groups of inlet guide vanes 64 (i.e., pivoted in groups of two or more such that every inlet guide vane 64 in a group rotates together the same amount). Position information (e.g., as sensed by electro-mechanical sensors or the like) for each of the inlet guide vanes 64 may be provided to the airflow controller 100.

The increased flow of air provided by the oversized compressor stage 60 may increase the air pressure at the compressor component 18. For example, in the case where the flow rate capacity of the compressor component 18 is about 10% to about 40% greater than the flow rate capacity of the turbine component 22, a corresponding pressure increase of about 5 to about 15 inches of water may be achieved. This pressure increase may be used to overcome pressure drop and facilitate proper mixing (described below) of cooler air with the exhaust gas stream 32 in the downstream exhaust processing system 14. The pressure increase may also be used to supercharge the gas turbine system 12.

An extraction system 70 may be provided to divert at least some of the excess air drawn in by the compressor component 18 around the combustor component 20 and turbine component 22 of the gas turbine system 12 to the mixing area 33. This "bypass air," which effectively bypasses the combustor component 20 and turbine component 22 of the gas turbine system 12, may be used to lower the temperature of the exhaust gas stream 32 in the mixing area 33 to a level suitable for the SCR catalyst 38.

Referring to FIGS. 1 and 2, the air extraction system 70 may be employed to extract at least some of the additional flow of air provided through use of the oversized compressor stage 60 of the compressor component 18. A flow of air 72 may be extracted using, for example, one or more extraction ducts 74 (FIG. 2). The extracted air, or "bypass air" (BA) does not enter the gas turbine system 12, but is instead directed to the mixing area 33 through bypass ducts 76 as indicated by arrows BA, where the bypass air may be used to cool the exhaust gas stream 32. Any remaining portion of the additional flow of air (i.e., any portion of the additional flow of air generated by the oversized compressor stage 60 and not extracted via the extraction ducts 74) enters the compressor component 18 of the gas turbine system 12 and flows through the gas turbine system 12 in a normal fashion. This acts to supercharge the gas turbine system 12, increasing the efficiency and power output of the gas turbine system 12.

The bypass air may be routed toward the mixing area 33 downstream of the turbine component 22 through one or more bypass ducts 76. The bypass air exits the bypass ducts 76 and enters the mixing area 33 through a bypass air injection grid 110 (FIG. 1), where the bypass air (e.g., ambient air) mixes with and cools the exhaust gas stream 32 to a temperature suitable for use with the SCR catalyst 38. In embodiments, the temperature of the exhaust gas stream 32 generated by the gas turbine system 12 is cooled by the bypass air from about 1100° F. to less than about 900° F. in the mixing area 33. The bypass air injection grid 110 may comprise, for example, a plurality of nozzles 112 or the like for directing (e.g., injecting) the bypass air into the mixing area 33. The nozzles 112 of the bypass air injection grid 110 may be distributed about the mixing area 33 in such a way as to maximize mixing of the bypass air and the exhaust gas stream 32 in the mixing area 33. The nozzles 112 of the bypass air injection grid 110 may be fixed in position and/or may be movable to selectively adjust the injection direction of bypass air into the mixing area 33.

A supplemental mixing system 78 (FIG. 1) may be positioned within the mixing area 33 to enhance the mixing process. The supplemental mixing system 78 may comprise, for example, a static mixer, baffles, and/or the like. The CO catalyst 36 may also help to improve the mixing process by adding back pressure (e.g., directed back toward the turbine component 22).

As depicted in FIG. 2, the air flow into each extraction duct 74 may be selectively controlled using a flow restriction system 80 comprising, for example, a damper 82, guide vane, or other device capable of selectively restricting airflow. Each damper 82 may be selectively controlled (e.g., rotated) by an independent actuator 84. The actuators 84 may comprise electro-mechanical motors, or any other type of suitable actuator. The dampers 82 may be independently and/or collectively controlled in response to commands from the airflow controller 100 to selectively vary the positioning of the dampers 82 such that a desired amount of bypass air is directed into the mixing area 33 via the bypass ducts 76. Position information (e.g., as sensed by electro-mechanical sensors or the like) for each of the dampers 82 may be provided to the airflow controller 100.

Bypass air may be selectively released from one or more of the bypass ducts 76 using an air release system 86 comprising, for example, one or more dampers 88 (or other devices capable of selectively restricting airflow, e.g. guide vanes) located in one or more air outlets 90. The position of a damper 88 within an air outlet 90 may be selectively controlled (e.g., rotated) by an independent actuator 92. The actuator 92 may comprise an electro-mechanical motor, or any other type of suitable actuator. Each damper 88 may be controlled in response to commands from the airflow controller 100 to selectively vary the positioning of the damper 88 such that a desired amount of bypass air may be released from a bypass duct 76. Position information (e.g., as sensed by electro-mechanical sensors or the like) for each damper 88 may be provided to the airflow controller 100. Further airflow control may be provided by releasing bypass air from one or more of the bypass ducts 76 through one or more metering valves 94 controlled via commands from the airflow controller 100.

Figure 3:
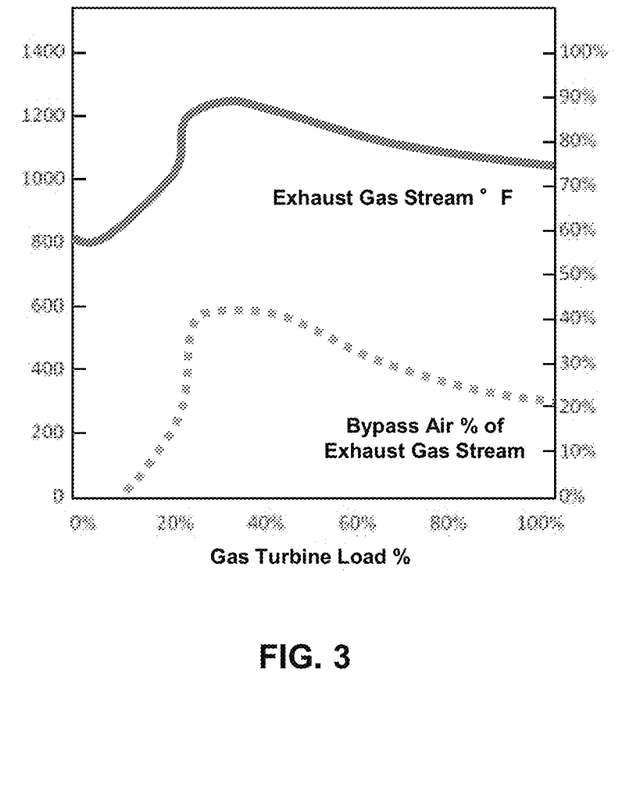
FIG. 3 is a chart showing an illustrative relationship between the flow of bypass air into a mixing area and the temperature of the exhaust gas stream at different load percentages of a gas turbine system according to embodiments.

The airflow controller 100 may be used to regulate the amount of air generated by the oversized compressor stage 60 that is diverted as bypass air into the mixing area 33 through the bypass ducts 76 relative to the amount of air that enters the gas turbine system 12 (and exits as the exhaust gas stream 32) in order to maintain a suitable temperature at the SCR catalyst 38 under varying operating conditions. A chart showing an illustrative relationship between the flow of bypass air into the mixing area 33 and the temperature of the exhaust gas stream 32 at different load percentages of the gas turbine system 12 is provided in FIG. 3. In this example, the chart in FIG. 3 depicts: 1) temperature variation of an exhaust gas stream 32 of a gas turbine system 12 at different load percentages of the gas turbine system 12; and 2) corresponding variation in the flow of bypass air as a percentage of the exhaust gas stream 32 (bypass ratio) needed to maintain the temperature at the SCR catalyst 38 at a suitable level (e.g., 900° F.) at different load percentages of the gas turbine system 12. As represented in the chart in FIG. 3, the amount of bypass air flowing through the bypass ducts 76 into the mixing area 33 may be varied (e.g., under control of the airflow controller 100) as the temperature of the exhaust gas stream 32 changes, in order to regulate the temperature at the SCR catalyst 38.

The airflow controller 100 may receive data 102 associated with the operation of the gas turbine power generation system 10. Such data may include, for example, the temperature of the exhaust gas stream 32 as it enters the mixing area 33, the temperature of the exhaust gas stream 32 at the SCR catalyst 38 after mixing/cooling has occurred in the mixing area 33, the temperature of the air drawn into the air intake section 16 by the oversized compressor stage 60 and/or the compressor component 18 of the gas turbine system 12, and other temperature data obtained at various locations within the gas turbine power generation system 10. The data 102 may further include airflow and pressure data obtained, for example, within the air intake section 16, at the inlet guide vanes 64, at the entrance of the oversized compressor stage 60 and/or other stages of the compressor component 18, within the extraction ducts 74, within the bypass ducts 76, at the downstream end 30 of the turbine component 22, and at various other locations within the gas turbine power generation system 10. Load data, fuel consumption data, and other information associated with the operation of the gas turbine system 12 may also be provided to the airflow controller 100. The airflow controller 100 may further receive positional information associated with the inlet guide vanes 64, dampers 82 and 88, valve 94, etc. It should be readily apparent to those skilled in the art how such data may be obtained (e.g., using appropriate sensors, feedback data, etc.), and further details regarding the obtaining of such data will not be provided herein.

Based on the received data 102, the airflow controller 100 is configured to vary as needed the amount of bypass air flowing through the bypass ducts 76 into the mixing area 33 to maintain the temperature at the SCR catalyst 38 at a suitable level. This may be achieved, for example, by varying at least one of: the flow of air drawn into the air intake section 16 by the compressor component 18 of the gas turbine system 12 (this flow may be controlled, for example, by adjusting the position of one or more of the inlet guide vanes 64); the flow of air 72 into the extraction ducts 74 (this flow may be controlled, for example, by adjusting the position of one or more of the dampers 82); and the flow of bypass air passing from the extraction ducts 74, through the bypass ducts 76, into the mixing area 33 (this flow may be controlled, for example, by adjusting the position of one or more of the dampers 88 and/or the operational status of the metering valves 94).

The airflow controller 100 may include a computer system having at least one processor that executes program code configured to control the amount of bypass air flowing through the bypass ducts 76 into the mixing area 33 using, for example, data 102 and/or instructions from human operators. The commands generated by the airflow controller 100 may be used to control the operation of various components (e.g., such as actuators 66, 84, 92, valve 94, and/or the like) in the gas turbine power generation system 10. For example, the commands generated by the airflow controller 100 may be used to control the operation of the actuators 66, 84, and 92 to control the rotational position of the inlet guide vanes 64, dampers 82, and dampers 88, respectively. Commands generated by the airflow controller 100 may also be used to activate other control settings in the gas turbine power generation system 10.

Use of an oversized compressor stage 60 in the compressor component 18 and air extraction system 70 in lieu of conventional large external blower systems and/or other conventional cooling structures provides many advantages. For example, the need for redundant external blower systems and associated components (e.g., blowers, motors and associated air intake structures, filters, ducts, etc.) is eliminated. This reduces manufacturing and operating costs, as well as the overall footprint, of the gas turbine power generation system 10. The footprint is further reduced as the oversized compressor stage 60 of the compressor component 18 draw in air through an existing air intake section 16, rather than through separate, dedicated intake structures often used with external blower systems.

Use an oversized compressor stage 60 provides a more reliable and efficient gas turbine power generation system 10. For example, since the bypass air used for cooling in the mixing area 33 is drawn in by the oversized compressor stage 60 of the compressor component 18, large external blower systems are no longer required. Further, at least a portion of the excess flow of air generated by the oversized compressor stage 60 may be used to supercharge the gas turbine system 12.

Power requirements of the gas turbine power generation system 10 are reduced because the oversized compressor stage 60 is coupled to, and driven by, the shaft 24 of the gas turbine system 12. This configuration eliminates the need for large blower motors commonly used in conventional external blower cooling systems.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airflow control system for a gas turbine system, comprising:
   a compressor component of a gas turbine system for generating a combined flow of air flowing through an air intake section of the gas turbine system, the combined flow of air including an operational flow of air supplied to a combustor component of the gas turbine system and an excess flow of air;
   a plurality of inlet guide vanes in the air intake section upstream from the compressor component, the combined flow of air passing through the inlet guide vanes, the inlet guide vanes controlling the combined flow of air passing through the air intake section to the compressor component;
   a mixing area for receiving an exhaust gas stream produced by the gas turbine system;
   an air extraction system for extracting at least a portion of the excess flow of air generated by the compressor component of the gas turbine system to provide bypass air, and for diverting the bypass air into the mixing area to reduce a temperature of the exhaust gas stream, the air extraction system including an air splitting system comprising:
      an outer bypass duct for diverting the bypass air around a combustor and turbine of the gas turbine system into the mixing area to reduce the temperature of the exhaust gas stream in the mixing area, wherein the outer bypass duct comprises an arrangement of axially extending ducts, the axially extending ducts arrayed circumferentially around the gas turbine system to surround the combustor and turbine: and
      an inner passage for directing any non-extracted portion of the excess flow of air into the combustor of the gas turbine system to supercharge the gas turbine system;
   and
   a selective catalytic reduction (SCR) system for processing the reduced temperature exhaust gas stream from the mixing area.

2. The airflow control system of claim 1, wherein the excess flow of air generated by the compressor component of the gas turbine system is 10% to 40% greater than a flow rate capacity of at least one of a combustor component and a turbine component of the gas turbine system.

3. The airflow control system of claim 2, wherein the compressor component of the gas turbine system includes at least one compressor stage for generating the excess flow of air.

4. The airflow control system of claim 1, further comprising a mixing system for mixing the bypass air with the exhaust gas stream in the mixing area.

5. The airflow control system of claim 1, further comprising a flow restriction system coupled to the bypass duct for selectively restricting the amount of bypass air flowing into the bypass duct.

6. A turbomachine system, comprising:
   a gas turbine system including a compressor component, a combustor component, and a turbine component, wherein the compressor component of the gas turbine system includes at least one oversized compressor stage for generating a combined flow of air flowing through an air intake section of the gas turbine system, the combined flow of air including an operational flow of air supplied to the combustor component of the gas turbine system and an excess flow of air;
   a plurality of inlet guide vanes in the air intake section upstream from the compressor component, the combined flow of air passing through the inlet guide vanes, the inlet guide vanes controlling the combined flow of air passing through the air intake section to the compressor component;
   a mixing area for receiving an exhaust gas stream produced by the gas turbine system;
   an air extraction system for extracting at least a portion of the excess flow of air generated by the at least one oversized compressor stage of the compressor component to provide bypass air; and diverting the bypass air into the mixing area to reduce a temperature of the exhaust gas stream, the air extraction system including an air splitting system comprising:
      an outer bypass duct for diverting the bypass air around the combustor and turbine of the gas turbine system into the mixing area to reduce the temperature of the exhaust gas stream in the mixing area, wherein the outer bypass duct comprises an arrangement of axially extending ducts, the axially extending ducts arrayed circumferentially around the gas turbine system to surround the combustor and turbine: and
      an inner passage for directing any non-extracted portion of the excess flow of air into the combustor of the gas turbine system to supercharge the gas turbine system;
   and
   an exhaust processing system for processing the reduced temperature exhaust gas stream, wherein the exhaust processing system comprises a selective catalytic reduction (SCR) system.

7. The turbomachine system of claim 6, wherein the excess flow of air generated by the at least one compressor stage of the compressor component is 10% to 40% greater than a flow rate capacity of at least one of the combustor component and the turbine component of the gas turbine system.

8. The turbomachine system of claim 7, further comprising a flow restriction system coupled to the bypass duct for selectively restricting the amount of bypass air flowing into the bypass duct.

9. The turbomachine system of claim 6, further comprising a mixing system for mixing the bypass air with the exhaust gas stream in the mixing area.

10. A power generation system, comprising:
a gas turbine system including a compressor component, a combustor component, and a turbine component, wherein the compressor component of the gas turbine system includes at least one oversized compressor stage for generating a combined flow of air flowing through an air intake section of the gas turbine system, the combined flow of air including an operational flow of air supplied to the combustor component of the gas turbine system and an excess flow of air;
a plurality of inlet guide vanes in the air intake section upstream from the compressor component, the combined flow of air passing through the inlet guide vanes, the inlet guide vanes controlling the combined flow of air passing through the air intake section to the compressor component;
a shaft driven by the turbine component;
an electrical generator coupled to the shaft for generating electricity;
a mixing area for receiving an exhaust gas stream produced by the gas turbine system;
an air extraction system for extracting at least a portion of the excess flow of air generated by the at least one compressor stage of the compressor component to provide bypass air; and diverting the bypass air into the mixing area to reduce a temperature of the exhaust gas stream, the air extraction system including an air splitting system comprising:
an outer bypass duct for diverting the bypass air around the combustor and turbine of the gas turbine system into the mixing area to reduce the temperature of the exhaust gas stream in the mixing area, wherein the outer bypass duct comprises an arrangement of axially extending ducts, the axially extending ducts arrayed circumferentially around the gas turbine system to surround the combustor and turbine: and
an inner passage for directing any non-extracted portion of the excess flow of air into the combustor of the gas turbine system to supercharge the gas turbine system;
and
an exhaust processing system for processing the reduced temperature exhaust gas stream, wherein the exhaust processing system comprises a selective catalytic reduction (SCR) system.

11. The power generation system of claim 10, wherein the excess flow of air generated by the at least one compressor stage of the compressor component is 10% to 40% greater than a flow rate capacity of at least one of the combustor component and the turbine component of the gas turbine system.

12. The power generation system of claim 10, further comprising a flow restriction system coupled to the bypass duct for selectively restricting the amount of bypass air flowing into the bypass duct.

* * * * *